United States Patent
Takezawa et al.

(10) Patent No.: US 9,249,293 B2
(45) Date of Patent: Feb. 2, 2016

(54) COMPOSITE PARTICLE, METHOD FOR PRODUCING THE SAME, AND RESIN COMPOSITION

(75) Inventors: Yoshitaka Takezawa, Tsukuba (JP); Fusao Hojo, Hitachi (JP); Shingo Tanaka, Hitachi (JP); Hiroyuki Kagawa, Hitachi (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 690 days.

(21) Appl. No.: 13/579,413

(22) PCT Filed: Feb. 17, 2011

(86) PCT No.: PCT/JP2011/053391
§ 371 (c)(1),
(2), (4) Date: Aug. 16, 2012

(87) PCT Pub. No.: WO2011/102421
PCT Pub. Date: Aug. 25, 2011

(65) Prior Publication Data
US 2012/0315487 A1 Dec. 13, 2012

(30) Foreign Application Priority Data
Feb. 18, 2010 (JP) .................................. 2010-033050

(51) Int. Cl.
| C08L 63/00 | (2006.01) |
| C09C 1/40 | (2006.01) |
| C09D 7/12 | (2006.01) |
| C09K 5/14 | (2006.01) |
| C08K 3/10 | (2006.01) |
| C08K 9/00 | (2006.01) |
| C08K 7/00 | (2006.01) |

(52) U.S. Cl.
CPC . *C08L 63/00* (2013.01); *C08K 9/00* (2013.01); *C09C 1/40* (2013.01); *C09D 7/1225* (2013.01); *C09K 5/14* (2013.01); *C01P 2004/61* (2013.01); *C08K 3/10* (2013.01); *C08K 7/00* (2013.01); *Y10T 428/31529* (2015.04)

(58) Field of Classification Search
None
See application file for complete search history.

(56) References Cited

U.S. PATENT DOCUMENTS

| 4,203,733 A * | 5/1980 | Tanaka et al. ................... 51/295 |
| 5,288,769 A * | 2/1994 | Papageorge et al. .......... 523/200 |
| 2003/0118501 A1* | 6/2003 | Chung et al. .................. 423/412 |

FOREIGN PATENT DOCUMENTS

| JP | 63-222043 | 9/1988 |
| JP | 3-5311 | 1/1991 |
| JP | 4-175209 | 6/1992 |
| JP | 8-26707 | 1/1996 |
| JP | 2005-225947 | 8/2005 |
| TW | 283738 | 8/1996 |
| TW | 200722405 | 6/2007 |

OTHER PUBLICATIONS

Taiwanese Official Action dated Jul. 31, 2013, for TW Application No. 1022101709001.

* cited by examiner

Primary Examiner — Sheeba Ahmed
(74) Attorney, Agent, or Firm — Fitch, Even, Tabin & Flannery LLP

(57) ABSTRACT

A composite particle is constituted to include: an aluminum nitride particle; a first coating layer that contains α-alumina and coats at least a part of a region of a surface of the aluminum nitride particle; and a second coating layer that contains organic matter and coats a region other than the first coating layer of the surface of the aluminum nitride particle.

7 Claims, 2 Drawing Sheets

COMPOSITE PARTICLE, METHOD FOR PRODUCING THE SAME, AND RESIN COMPOSITION

TECHNICAL FIELD

The present invention relates to composite particles, methods for producing the composite particles, and resin compositions.

BACKGROUND ART

In recent years, with miniaturization and technological advance of electronic devices, how to take heat dissipation measures has become an important problem. Thus, in order to achieve the high thermal conduction of a resin which constitutes a substrate on which an electronic component is implemented, a method of adding particles with a high degree of thermal conductivity as fillers to the resin has generally been used. Particles with a higher degree of thermal conductivity have been used as electrically insulative fillers added to form an insulative resin with high thermal conductivity.

For example, a method of using aluminum nitride having a high degree of thermal conductivity as a filler has been examined. However, aluminum nitride is extremely unstable against water and is easily reacted with water in atmospheric air to generate ammonia to generate aluminum hydroxide on the surface of an aluminum nitride powder.

Accordingly, it has been known that thermal conductivity is deteriorated with generation of aluminum hydroxide even when powdery aluminum nitride is stored in atmospheric air for a long term or dispersed in a resin or the like. Thus, for example, a method of improving water resistance by coating the surface of aluminum nitride with an organic matter or an inorganic matter has been known.

However, an organic matter or an inorganic matter on an aluminum nitride surface has sometimes inhibited thermal conduction to decrease the degree of the thermal conductivity of a composite material per se in the case of making composite aluminum nitride particles by coating the aluminum nitride particle surface with the organic matter or the inorganic matter (such as metal oxide, glass, or a metal salt). Further, a method of using α-transformed alumina having good thermal conductivity for a surface-coated inorganic matter in a coating layer to reduce the effect of inhibition of thermal conduction by surface coating has been known (e.g., see Japanese Patent Application Laid-Open (JP-A) No. 4-175209).

However, a coating layer including crystalline α-alumina has insufficient water resistance since many cracks are generally generated during sintering. Thus, a method of reducing the occurrence of cracking by controlling the amount of an oxygen gas in a sintering gas when a crystalline α-alumina layer is formed on an aluminum nitride surface has been known (e.g., see JP-A 2005-225947).

DISCLOSURE OF INVENTION

Technical Problem

The effect of addition of a filler with high thermal conductivity in a resin constituting a substrate is generally improved in a case the amount of the filled filler is increased; however, by highly filling particles where an aluminum nitride surface is coated only with α-alumina, viscosity has been increased during mixture with the resin to deteriorate moldability, adhesiveness, and/or the like, so that improvement in a degree of thermal conductivity has sometimes been precluded.

The present invention is aimed at providing: a composite particle excellent in thermal conductivity and water resistance; a method for producing the composite particle; and a resin composition, a metal foil with a resin, and a resin sheet which include the composite particle and are excellent in thermal conductivity.

Solution to Problem

Specific means for solving the above described problems are as follows:

<1> A composite particle including: an aluminum nitride particle; a first coating layer that contains α-alumina and coats at least a part of a region of a surface of the aluminum nitride particle; and a second coating layer that contains organic matter and coats a region other than the first coating layer of the surface of the aluminum nitride particle.

<2> The composite particle according to the above described <1>, wherein the organic matter is a reaction product of a compound including a hydrocarbon group having a carbon number of 1 to 24 and at least either of hydroxy or carboxy groups with aluminum nitride.

<3> The composite particle according to the above described <1> or the above described <2>, wherein the composite particle has an intensity ratio of a peak corresponding to a (100) face of α-alumina to a peak corresponding to a (113) face of aluminum nitride, of 1 or less in terms of area, in X-ray diffraction by a CuKα ray.

<4> A resin composition including: the composite particle according to any one of the above described <1> to <3>; an epoxy resin; and a curing agent.

<5> A metal foil with a resin, including: a metal foil; and a semi-cured resin layer disposed on the metal foil and derived from the resin composition according to the above described <4>.

<6> A resin sheet, which is a cured product prepared by heating and pressurization treatment of the resin composition according to the above described <4>.

<7> A method for producing a composite particle, including the steps of: heat-treating an aluminum nitride particle at 1100° C. or more to form a coating layer containing α-alumina on a surface of the aluminum nitride particle; and bringing the aluminum nitride particle on the surface of which the coating layer containing the α-alumina is formed into contact with a compound containing a hydrocarbon group having a carbon number of 1 to 24 and at least either of hydroxy or carboxy groups.

Advantageous Effects of Invention

In accordance with the present invention, there can be provided: a composite particle excellent in thermal conductivity and water resistance; a method for producing the composite particle; and a resin composition, a metal foil with a resin, and a resin sheet which include the composite particle and are excellent in thermal conductivity.

BEST MODE FOR CARRYING OUT THE INVENTION

Figure 1:
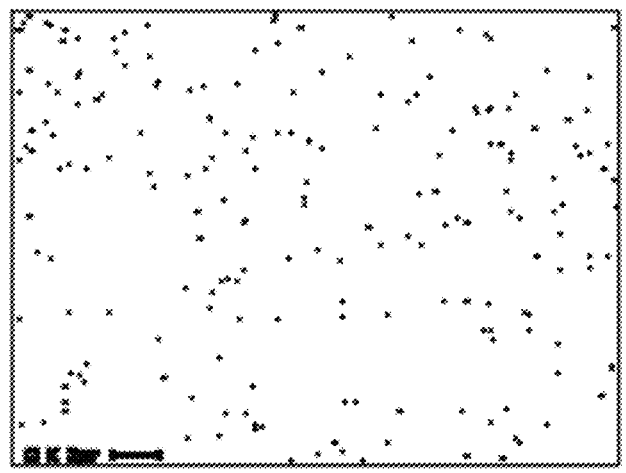
FIG. 1 is a view that represents an example of the distribution of carbon atoms in SEM-EDX analysis of the composite particle according to the present invention.

The term "step" as used herein encompasses not only an independent step but also a step, in which the anticipated effect of this step is achieved, even if the step is not able to be definitely distinguished from another step.

In addition, a numerical value range indicated by using "to" as used herein refers to a range including numerical values described before and after "to" as the minimum and maximum values, respectively.

<Composite Particle>

The composite particle according to the present invention includes: an aluminum nitride particle; a first coating layer that contains α-alumina and coats at least a part of a region of a surface of the aluminum nitride particle; and a second coating layer that contains organic matter and coats a region other than the first coating layer of the surface of the aluminum nitride particle.

Thermal conductivity and water resistance are made to be excellent by coating the surface of the aluminum nitride particle with the first coating layer containing α-alumina and the second coating layer containing the organic matter. Furthermore, by making the second coating layer contain the organic matter, for example, compatibility with and dispersibility in a resin are made to be excellent, increase in viscosity is suppressed in a case a resin composition is constituted, and the resin composition excellent in moldability and adhesiveness can be constituted.

In a case the first coating layer containing α-alumina having good thermal conductivity is formed on the surface of the aluminum nitride particle, it is necessary to perform heat treatment at a high temperature. Therefore, it is difficult to homogeneously coat the whole surface of the aluminum nitride particle with the first coating layer containing α-alumina, so that the first coating layer is cracked to form a region where aluminum nitride is exposed to the surface. A composite particle excellent in water resistance can be constituted while maintaining excellent thermal conductivity by disposing the second coating layer containing the organic matter on such a region where aluminum nitride is exposed.

The surface state of such a composite particle can be observed by, for example, using a scanning electron microscope with an energy dispersive X-ray analyzer (SEM-EDX) to analyze the distributions of oxygen atoms (O) corresponding to the first coating layer containing α-alumina, carbon atoms (C) corresponding to the second coating layer containing the organic matter, and aluminum atoms (Al) corresponding to α-alumina and aluminum nitride, respectively.

In accordance with the present invention, the ratio between the amount of the first coating layer which is present and the amount of the second coating layer which is present on the surface of the aluminum nitride particle is, without particular limitation, preferably 0.01 to 1.0, more preferably 0.1 to 0.5, as second coating layer/first coating layer in terms of atoms, from the aspect of thermal conductivity and water resistance.

The amount of the first coating layer which is present and the amount of the second coating layer which is present on the surface of the aluminum nitride particle can be calculated by quantitating the distribution amounts of oxygen atoms and carbon atoms, respectively, using SEM-EDX.

The content ratio of the organic matter contained in the composite particle is, without particular limitation, preferably 0.01 mass % to 0.5 mass %, more preferably 0.02 mass % to 0.05 mass %, in the composite particle from the aspect of thermal conductivity and water resistance.

The content ratio of the organic matter contained in the composite particle can be calculated by performing thermogravimetric analysis. Specifically, the calculation can be performed by measuring a change in weight due to heating of the composite particle using a thermogravimetric analyzer (TGA) on the conditions of a measuring range of 25 to 800° C. and a temperature increase rate of 10° C./min to measure a decrease in weight due to the thermal decomposition of the organic matter.

The content ratio of the organic matter contained in the composite particle can be controlled by, for example, appropriately selecting various conditions in an organic matter layer formation step described below. Specifically, the content ratio of the organic matter contained in the composite particle can be made to be in a desired range by, for example, appropriately selecting the kind and the concentration of a compound brought into contact with the aluminum nitride particle on which the first coating layer is formed, and contact time and contact temperature.

In accordance with the present invention, the layer thickness of the coating layer (first coating layer) containing α-alumina formed on the surface of the aluminum nitride particle is not particularly limited. The layer thickness of the first coating layer is preferably 1 nm or more and 3000 nm or less from the aspect of thermal conductivity and water resistance, more preferably 1 nm or more and 200 nm or less from the aspect of thermal conductivity, further preferably 10 nm or more and 200 nm or less from the aspect of water resistance.

The layer thickness of the first coating layer can be estimated from an intensity ratio (A/B) between a peak (A) corresponding to the (100) face of α-alumina and a peak (B) corresponding to the (113) face of aluminum nitride in terms of area in X-ray diffraction by a CuKα ray.

Specifically, the layer thickness of the first coating layer containing α-alumina can be calculated from the obtained intensity ratio. Specifically, the layer thickness of the first coating layer is calculated as described below.

For the layer thickness of the first coating layer, as for the peak (A) corresponding to the (100) face of α-alumina and the peak (B) corresponding to the (113) face of aluminum nitride in X-ray diffraction by a CuKα ray, the integral intensity ratio (A/B) of the respective peaks is standardized based on ICDD (International Centre for Diffraction Data) data and converted into a volume ratio between α-alumina and aluminum nitride. The layer thickness of the first coating layer can be calculated from the converted volume ratio between α-alumina and aluminum nitride and the particle diameter of the composite particle.

Further, the intensity ratio of the peak corresponding to the (100) face of α-alumina to the peak corresponding to the (113) face of aluminum nitride in X-ray diffraction is determined as described below.

X-ray diffraction spectra (XRD) are measured using RINT 2500HL (manufactured by Rigaku Corporation) as an X-ray diffractometer and a CuKα ray as an X-ray source. The peak corresponding to the (100) face of α-alumina at 2θ of around 42.5 to 44.5° and the peak corresponding to the (113) face of aluminum nitride at 2θ of around 32.5 to 33.5° are identified from the obtained X-ray diffraction spectra, respectively, and the intensities of the respective peaks are determined from peak areas. The intensity ratio of the peak corresponding to the (100) face of α-alumina to the peak corresponding to the (113) face of aluminum nitride in terms of area can be calculated based on the obtained peak intensities.

In accordance with the present invention, the intensity ratio of the peak corresponding to the (100) face of α-alumina to the peak corresponding to the (113) face of aluminum nitride is preferably 1 or less, more preferably 0.001 or more and 1 or less, further preferably 0.003 or more and 0.1 or less, in terms of area, from the aspect of thermal conductivity and water resistance, and particularly preferably 0.003 or more and 0.02 or less from the aspect of thermal conductivity.

The intensity ratio of 1 or less allows the percentage of α-alumina crystals to aluminum nitride in the composite particle to decrease to be able to more effectively obtain the effect of higher heat conduction by being composite.

The layer thickness of the first coating layer containing α-alumina can be controlled by, for example, appropriately selecting various conditions in an oxidation step and an α-transformation step described below. Specifically, the desired layer thickness can be achieved by, for example, appropriately selecting the amount of oxygen used in the oxidation step and the α-transformation step, the amount of hydrolysis on the surface of aluminum nitride, and/or the like.

Further, the particle shapes of composite particles include generally spherical, flat, block, plate, squamous shapes, and the like. The generally spherical and flat shapes are preferred from the aspect of dispersibility and thermal conductivity.

Further, the particle diameter of the composite particle is not particularly limited. For example, a volume average particle diameter may be 0.5 μm to 300 μm and preferably 1 μm to 100 μm, more preferably 10 μm to 50 μm, from the aspect of thermal conductivity and filling into a resin.

The volume average particle diameter is measured using a laser diffractometry. The laser diffractometry can be performed using a laser diffraction scattering particle size distribution measuring apparatus (e.g., LS230 manufactured by Beckman Coulter, Inc.).

<Method for Producing Composite Particle>

The composite particle according to the present invention can be produced by, for example, a production method including the steps of: 1) heat-treating an aluminum nitride particle at 1100° C. or more to form a coating layer containing α-alumina on a surface of the aluminum nitride particle; and 2) bringing the aluminum nitride particle on the surface of which the coating layer containing the α-alumina is formed into contact with a compound containing a hydrocarbon group having a carbon number of 1 to 24 and at least either of hydroxy or carboxy groups, and including another step as needed.

The composite particle including: an aluminum nitride particle; a first coating layer that coats at least a part of a region of a surface of the aluminum nitride particle and contains α-alumina; and a second coating layer that coats a region other than the first coating layer of the surface of the aluminum nitride particle and contains organic matter can efficiently be produced by such a production method.

The content of aluminum nitride contained in the aluminum nitride particle used in the present invention is, without particular limitation, preferably 95 mass % or more, more preferably 98 mass % or more, from the aspect of thermal conductivity.

The aluminum nitride particle may also be a single crystal of aluminum nitride or a particle in which two or more crystals of aluminum nitride are sintered.

Further, the shapes of aluminum nitride particles include generally spherical, flat, block, plate, squamous shapes, and the like. The generally spherical and flat shapes are preferred from the aspect of dispersibility and thermal conductivity.

Further, the particle diameter of the aluminum nitride particle is not particularly limited. For example, a volume average particle diameter may be 0.5 μm to 300 μm and preferably 1 μm to 100 μm, more preferably 10 μm to 50 μm, from the aspect of thermal conductivity and filling into a resin.

The volume average particle diameter is measured using a laser diffractometry. The laser diffractometry can be performed using a laser diffraction scattering particle size distribution measuring apparatus (e.g., LS230 manufactured by Beckman Coulter, Inc.).

The aluminum nitride particle can be produced by a method that is commonly performed. Specific examples may include direct nitriding, reduction nitriding, gas phase reaction methods, and the like.

It may also appropriately be selected from commercially available aluminum nitride particles.

The coating layer containing α-alumina is formed on the surface of an aluminum nitride particle by heat treatment at 1100° C. or more. The coating layer (first coating layer) containing α-alumina is formed on the surface of the aluminum nitride particle by heat treatment at a temperature of 1100° C. or more. In contrast, in a case the temperature of the heat treatment is less than 1100° C., α-crystallization does not sufficiently proceeds, so that the coating layer containing α-alumina may not be formed.

A method of forming the coating layer containing α-alumina on the surface of an aluminum nitride particle can appropriately be selected from methods that are commonly used without particular limitation and may be a method of directly forming a coating layer containing α-alumina on the surface of an aluminum nitride particle or a method of forming aluminum oxide other than α-alumina, such as γ-alumina, on the surface of an aluminum nitride particle and α-crystallizing it to form the coating layer containing α-alumina by heat-treating it at 1100° C. or more.

In accordance with the present invention, the method including the oxidation step of forming a coating layer containing aluminum oxide other than α-alumina, such as γ-alumina, on the surface of an aluminum nitride particle and the α-transformation step of α-crystallizing aluminum oxide formed on the surface of an aluminum nitride particle by heat-treating it at 1100° C. or more is preferred from the aspect of thermal conductivity and film thickness control. The oxidation step and the α-transformation step may each independently be performed or may successively be performed.

The oxidation steps of forming a coating layer containing aluminum oxide other than α-alumina, such as γ-alumina, on the surface of an aluminum nitride particle include, for example, a method of heat-treating an aluminum nitride particle under an oxygen-containing gas atmosphere to form aluminum oxide, a method of heat-treating an aluminum nitride particle under an atmosphere with the limited amount of oxygen to form aluminum oxide, a method of hydrolyzing the surface of aluminum nitride and thereafter heat-treating it under an inert gas atmosphere to form aluminum oxide, and the like.

As used herein, the inert gas atmosphere is synonymous with an inert gas atmosphere in the α-transformation step described below.

The amount of oxygen in the case of heat-treating an aluminum nitride particle under an atmosphere with the limited amount of oxygen may appropriately be selected depending on the thickness of an aluminum oxide coating layer formed on the surface of the aluminum nitride particle. For example, the amount of oxygen may be 5 to 50 ml based on the aluminum nitride particle having a mass of 100 g.

Further, the methods of hydrolyzing the surface of aluminum nitride may include a method of to leaving an aluminum nitride particle to stand in a normal atmospheric air for 0.1 to 1 hour, a method of stirring in a solvent containing water, and the like.

In accordance with the present invention, the method of heat-treating an aluminum nitride particle under an atmosphere with the limited amount of oxygen to form aluminum oxide or the method of hydrolyzing the surface of aluminum nitride and thereafter heat-treating it under an inert gas atmosphere to form aluminum oxide are preferred from the aspect of thermal conductivity.

A heat treatment temperature in the oxidation step is preferably such a temperature that α-crystallization of aluminum oxide does not proceed, more preferably less than 1100° C., further preferably 1000° C. or less.

Further, heat treatment time in the oxidation step can appropriately be selected depending on heat treatment temperature and/or the like. It is preferably 10 to 200 minutes, more preferably 30 to 120 minutes, from the aspect of thermal conductivity.

The heat treatment in the oxidation step may be performed at a constant temperature or may be performed by, for example, increasing a temperature from room temperature to a predetermined temperature. In accordance with the present invention, it is preferable to perform the heat treatment by increasing a temperature from room temperature to a predetermined temperature from the aspect of thermal conductivity and productivity.

In a case the heat treatment in the oxidation step is performed by increasing a temperature from room temperature to a predetermined temperature, the predetermined temperature of 1100° C. and a temperature increase time of 10° C./min are preferable, and the predetermined temperature of 1000° C. and a temperature increase time of 10° C./min are more preferable.

Aluminum oxide other than α-alumina, formed on the surface of aluminum nitride, can be α-crystallized by heat treatment at a high temperature (α-transformation step).

A heat treatment temperature in the α-transformation step is preferably 1100° C. or more, more preferably 1150° C. or more, from the aspect of thermal conductivity.

Further, heat treatment time in the alpha-transformation step can appropriately be selected depending on the heat treatment temperature and/or the like. From the aspect of thermal conductivity, it is preferably 0.2 to 3 hours, more preferably 0.5 to 1 hour.

The heat treatment in the α-transformation step may be performed at a constant temperature or may be performed by, for example, increasing a temperature from the heat treatment temperature in the oxidation step to a predetermined temperature and thereafter maintaining the predetermined temperature. In accordance with the present invention, it is preferable to perform the heat treatment by increasing a temperature from the heat treatment temperature in the oxidation step to a predetermined temperature and thereafter maintaining the predetermined temperature from the aspect of thermal conductivity and productivity.

When the heat treatment in the oxidation step is performed by increasing a temperature from the heat treatment temperature in the oxidation step to a predetermined temperature and thereafter maintaining the predetermined temperature, the predetermined temperature of 1100 to 1300° C. and time for which the predetermined temperature is maintained, of 0.2 to 3 hours are preferable, and the predetermined temperature of 1150 to 1200° C. and time for which the predetermined temperature is maintained, of 0.5 to 2 hours are more preferable.

The heat treatment in the α-transformation may preferably be performed under an inert gas atmosphere from the aspect of thermal conductivity. In the inert gas atmosphere, an oxygen content is preferably not more than 0.1% by volume. Further, inert gases may include nitrogen, argon, helium, and the like.

The method for producing a composite particle according to the present invention includes the organic matter layer formation step of bringing an aluminum nitride particle on the surface of which a coating layer containing α-alumina is formed into contact with a compound containing a hydrocarbon group having a carbon number of 1 to 24 and at least either of hydroxy or carboxy groups.

By bringing the aluminum nitride particle, obtained as described above, on the surface of which the coating layer containing α-alumina is formed into contact with the compound (hereinafter also referred to as "specific compound") containing a hydrocarbon group having a carbon number of 1 to 24 and at least either of hydroxy or carboxy groups, a coating layer (second coating layer) containing an organic matter can be formed in the region where the coating layer containing α-alumina is not formed on the surface of the aluminum nitride particle.

This can be considered, for example, as described below.

In a case a coating layer containing α-alumina is formed on the surface of aluminum nitride as described above, the formed coating layer containing α-alumina is cracked. Thereby, the region that is not coated with the coating layer containing α-alumina is generated on the surface of an aluminum nitride particle. The compound containing a hydrocarbon group having a carbon number of 1 to 24 and at least either of hydroxy or carboxy groups is brought into contact with such a region that is not coated with the coating layer containing α-alumina on the surface of the aluminum nitride particle. Since the specific compound is considered not to have reactivity with alumina but to selectively react with aluminum nitride, a coating layer containing an organic matter which is the reaction product of the specific compound with aluminum nitride can be considered to be formed on the region that is not coated with the coating layer containing α-alumina on the surface of the aluminum nitride particle.

Compounds containing a hydrocarbon group having a carbon number of 1 to 24 and at least either of hydroxy or carboxy groups in accordance with the present invention may specifically include organic compounds as described below.

Compounds containing a hydrocarbon group having a carbon number of 1 to 24 and a hydroxy group may include: cyclic, straight-chain, or branched-chain monohydric alcohols such as methyl alcohol, ethyl alcohol, propyl alcohol, isopropyl alcohol, butyl alcohol, hexyl alcohol, cyclohexyl alcohol, octyl alcohol, lauryl alcohol, octadecyl alcohol, and behenyl alcohol; glycols and diols such as ethylene glycol, propylene glycol, trimethylene glycol, and butylene glycol; polyhydric alcohols such as glycerol, erythritol, glucitol, and mannitol; saccharides; polysaccharides; and the like.

Furthermore, thiols in which an oxygen atom in a hydroxy group is substituted with sulfur may also be used.

Organic compounds having a carboxy group may include: monocarboxylic acids such as acetic acid, propionic acid, octanoic acid, lauric acid, myristic acid, palmitic acid, stearic acid, behenic acid, acrylic acid, crotonic acid, oleic acid, and linoleic acid; di- and tricarboxylic acids such as oleyl alcohol succinic acid, oxalic acid, malonic acid, succinic acid, glutaric acid, adipic acid, pimelic acid, suberic acid, azelaic acid, sebacic acid, undecanedioic acid, and dodecanedioic acid; aromatic carboxylic acids such as phthalic acid, terephthalic acid, and trimellitic acid; and the like.

Furthermore, thiocarboxylic acids and dithiocarboxylic acids in which an oxygen atom in a carboxy group is substituted with sulfur may also be used.

Among them, from the aspect of thermal conductivity and water resistance, compounds having a hydrocarbon group having a carbon number of 2 to 20 and at least either of hydroxy or carboxy groups are preferable, compounds having a hydrocarbon group having a carbon number of 2 to 20 and one to two groups of at least either of hydroxy or carboxy groups are more preferable, and compounds having a hydrocarbon group having a carbon number of 2 to 20 and one group of at least either of hydroxy or carboxy groups are further preferable.

Further, from the aspect of thermal conductivity and water resistance, it is preferable to use at least one selected from compounds having a hydrocarbon group having a carbon number of 1 to 24 and a carboxy group and compounds having a hydrocarbon group having a carbon number of 1 to 24 and a hydroxy group, it is more preferable to use at least one selected from compounds having a hydrocarbon group having a carbon number of 2 to 24 and one to two carboxy groups and compounds having a hydrocarbon group having a carbon number of 2 to 24 and one to two hydroxy groups, and it is further preferable to use at least one selected from compounds having a hydrocarbon group having a carbon number of 4 to 24 and one carboxy group and compounds having a hydrocarbon group having a carbon number of 4 to 24 and one hydroxy group.

The compounds containing a hydrocarbon group having a carbon number of 1 to 24 and at least either of hydroxy or carboxy groups may be used alone or in admixture of two or more.

Further, the polarity of the surface of the composite particle can be controlled and dispersibility in a resin can be adjusted by using a compound containing a hydrocarbon group having a carbon number of 1 to 24 and one group of at least either of hydroxy or carboxy groups and a compound having a lot of alcohol and carboxy groups in a part of an organic compound having alcoholic hydroxy and carboxy groups used.

As a method of bringing an aluminum nitride particle on the surface of which a coating layer containing α-alumina is formed into contact with a compound (specific compound) containing a hydrocarbon group having a carbon number of 1 to 24 and at least either of hydroxy or carboxy groups, a commonly used method may be used without particular limitation. For example, mention may be made of a method of immersing an aluminum nitride particle on the surface of which a coating layer containing α-alumina is formed in a specific compound or the solution thereof; a method of applying a specific compound or the solution thereof to an aluminum nitride particle on the surface of which a coating layer containing α-alumina is formed; a method of bringing an aluminum nitride particle on the surface of which a coating layer containing α-alumina is formed into contact with the gas of a specific compound; and the like. In accordance with the present invention, the method of immersing an aluminum nitride particle on the surface of which a coating layer containing α-alumina is formed in a specific compound or the solution thereof is preferred from the aspect of reactivity.

In a case an aluminum nitride particle on the surface of which a coating layer containing α-alumina is formed is immersed in the solution of a specific compound, the concentration of the specific compound is, without particular limitation, preferably 0.1 mass % to 20 mass %, more preferably 0.5 mass % to 5 mass %, from the aspect of reactivity and dispersibility.

Further, a solvent constituting the solution of the specific compound is, without particular limitation, preferably an organic solvent. Organic solvents may include: for example, hydrocarbon solvents such as toluene, xylene, and chlorobenzene; alkyl halide solvents such as chloroform, dichloromethane, trichloroethane, and carbon tetrachloride; ether solvents such as diethyl ether, diisopropyl ether, and THF; ester solvents such as ethyl acetate and butyl acetate; and the like. Especially, from the aspect of a moisture content and compatibility with the specific compound, at least one selected from the hydrocarbon solvents and the ether solvents is preferable and the hydrocarbon solvents are more preferable.

Further, time for which an aluminum nitride particle on the surface of which a coating layer containing α-alumina is formed is brought into contact with a specific compound is not particularly limited but can appropriately be selected depending on the kind of the specific compound, a contact temperature, and/or the like. For example, it may be 10 minutes to 12 hours, and is preferably 1 to 4 hours, more preferably 2 to 4 hours, from the aspect of thermal conductivity and water resistance.

Furthermore, a temperature at which an aluminum nitride particle on the surface of which a coating layer containing α-alumina is formed is brought into contact with a specific compound is not particularly limited but can appropriately be selected depending on the kind of the specific compound, contact time, and/or the like. For example, it may be 25° C. to 150° C., and is preferably 30° C. to 120° C., more preferably 50° C. to 120° C., from the aspect of thermal conductivity and water resistance.

From the aspect of thermal conductivity and water resistance, the organic matter layer formation step in accordance with the present invention is preferably the step of immersing an aluminum nitride particle on the surface of which a coating layer containing α-alumina is formed in a specific compound selected from compounds containing a hydrocarbon group having a carbon number of 1 to 24 and at least either of hydroxy or carboxy groups to cause contact between them at a temperature of 25° C. to 150° C. for 1 to 12 hours, more preferably the step of immersing an aluminum nitride particle on the surface of which a coating layer containing α-alumina is formed in a specific compound selected from compounds containing a hydrocarbon group having a carbon number of 1 to 24 and at least either of hydroxy or carboxy groups to cause contact between them at a temperature of 50° C. to 120° C. for 2 to 4 hours.

Post-treatment, such as washing or drying, of a composite particle obtained by bringing an aluminum nitride particle on the surface of which a coating layer containing α-alumina is formed into contact with a specific compound may also be performed as needed.

<Resin Composition>

The resin composition according to the present invention includes at least one of the composite particles, at least one of epoxy resins, and at least one of curing agents, and another component as needed.

A thermosetting resin composition excellent in thermal conductivity and moldability can be constituted by including at least one of the composite particles.

(Composite Particle)

The resin composition includes at least one of composite particles having the previously mentioned aluminum nitride particle, a first coating layer that coats at least a part of a region on the surface of the aluminum nitride particle and contains α-alumina, and a second coating layer that coats the region other than the first coating layer on the surface of the aluminum nitride particle and contains organic matter.

A preferred embodiment of composite particles contained in the resin composition is as mentioned previously.

The content of the composite particles in the resin composition is not particularly limited, and the content in the solid content of the resin composition is preferably 60 to 98 mass %, more preferably 80 to 95 mass % from the aspect of thermal conductivity and moldability.

As used herein, the solid content means the total amount of nonvolatile components in components constituting the resin composition.

The composite particles contained in the resin composition may be used alone or in combination of two or more. In a case the composite particles are used in combination of two or more, the two or more composite particles may include, for example, those of which the particle diameters are different from each other, those of which the contents of the organic matters are different from each other, the structures of the organic matters are different from each other, and the layer thicknesses of the coating layers containing α-alumina are different from each other, and combinations thereof.

(Epoxy Resin)

The epoxy resin contained in the resin composition may appropriately be selected from epoxy resins that are commonly used in thermosetting resin compositions, depending on a purpose.

The epoxy resins may specifically include, for example, epoxy phenol novolac resins, epoxy orthocresol novolac resins, and those prepared by epoxidizing novolac resins obtained by condensation or co-condensation of phenols such as phenol, cresol, xylenol, resorcin, catechol, bispenol A, and bisphenol F and/or naphthols such as α-naphthol, β-naphthol, and dihydroxynaphthalene with compounds having an aldehyde group, such as formaldehyde, acetaldehyde, propionaldehyde, benzaldehyde, and salicylaldehyde under an acid catalyst, including epoxy resins having a triphenylmethane skeleton.

Mentions is also made of: bispenol A; bisphenol F; bisphenol S; stilbene epoxy resins; hydroquinone epoxy resins; glycidyl ester epoxy resins obtained by reaction of polybasic acids such as phthalic acid and dimer acid with epichlorohydrin; glycidyl amine epoxy resins obtained by reaction of polyamines such as diaminodiphenyl methane and isocyanuric acid with epichlorohydrin; epoxidized products of co-condensation resins of dicyclopentadiene with phenols; epoxidized products of aralkyl phenol resins such as epoxy resins having a naphthalene ring, phenol aralkyl resins, phenol aralkyl resins containing a biphenylene skeleton, and naphthol aralkyl resins; trimethylol propane epoxy resins; terpene-modified epoxy resins; linear aliphatic epoxy resins obtained by oxidizing an olefin bond with a peroxy acid such as peracetic acid; alicyclic epoxy resins; sulfur atom-containing epoxy resins; and the like.

These epoxy resins may be used alone or together in combination of two or more.

The content of an epoxy resin in the resin composition is not particularly limited, and the content in the solid content of the resin composition is preferably 2 to 40 mass %, more preferably 5 to 20 mass %, from the aspect of thermal conductivity and moldability.

(Curing Agent)

The curing agent contained in the resin composition may appropriately be selected from curing agents that are commonly used in thermosetting resin compositions containing epoxy resins, depending on a purpose.

Specifically, for example, mention may be made of poly-addition curing agents such as novolac resin, aromatic amine-based curing agents, aliphatic amine-based curing agents, mercaptan-based curing agents, acid anhydride curing agents, and isocyanate-based curing agents; and latent curing agents such as imidazole, TPP, and blocked isocyanate-based curing agents.

The content of a curing agent in the solid content of the resin composition may appropriately be set in consideration of the kind of the curing agent and the physical properties of a resin molded body formed by thermally curing the resin composition.

Specifically, the content of the curing agent in the solid content of the resin composition is such a content that the chemical equivalent of the curing agent is preferably 0.005 to 5 equivalents, more preferably 0.01 to 3 equivalents, further preferably 0.5 to 1.5 equivalents, based on 1 mole of epoxy groups.

In a case the content of the curing agent is 0.005 equivalent or more based on 1 mole of epoxy groups, an epoxy resin tends to be able to be immediately cured. In contrast, in a case it is 5 equivalents or less, excessively fast curing reaction can be suppressed.

For example, in a case an amine-based curing agent is used as a curing agent, a chemical equivalent as used herein represents the number of moles of active hydrogen in the amine based on 1 mole of epoxy groups.

The resin composition according to the present invention may also include another component as well as the above described essential components. Such other components may include, for example, solvents, dispersing agents, anti-settling agents, and the like.

As the solvents, organic solvents which are commonly used can appropriately be selected and used without particular limitation unless the curing reaction of the resin composition is inhibited.

<B-Stage Sheet>

A B-stage sheet according to the present invention includes a semi-cured resin composition derived from the resin composition and has a sheet-like shape.

The B-stage sheet can be produced by a production method including, for example, the steps of applying and drying the resin composition on a mold releasing film to form a resin composition layer; and heat-treating the resin composition layer into a B-stage state.

Due to the heat treatment and the formation of the resin composition, the degree of thermal conductivity is excellent and flexibility and working life as the B-stage sheet are excellent.

The B-stage sheet according to the present invention is one in which the viscosity of the resin sheet is $10^4$ to $10^5$ Pa·s at an ordinary temperature (25° C.) whereas the viscosity is decreased to $10^2$ to $10^3$ Pa·s at 100° C. Further, a cured resin layer after being cured, as described below, is not melted even by heating. The above described viscosity can be measured by dynamic viscoelasticity measurement (frequency: 1 Hz, load: 40 g, rate of temperature increase: 3° C./min).

Specifically, the resin composition layer can be formed by, for example, applying a varnish-like resin composition, in which a solvent such as methyl ethyl ketone or cyclohexanenone is added, onto a mold releasing film such as a PET film, followed by drying it.

The coating may be performed by a known method. Coating methods specifically include methods such as comma coating, die coating, lip coating, and gravure coating. As an application method for forming a resin composition layer to a predetermined thickness, a comma coating method of passing a material to be applied between gaps, a die coating method of applying a resin varnish, of which the flow rate is adjusted, from a nozzle, or the like may be applied. For example, in a case the thickness of a resin composition layer prior to drying is 50 μm to 500 μm, it is preferable to use the comma coating method.

Since a curing reaction hardly proceeds in an applied resin composition layer, the layer is poor in flexibility as a sheet although having flexibility, poor in self-standing of a sheet in the state of removing the PET film which is a substrate, and difficult to handle. Thus, in accordance with the present invention, the resin composition is made to be in B-stage by heat treatment described below.

In accordance with the present invention, conditions where the obtained resin composition layer is heat-treated are not particularly limited, if the resin composition can be semi-cured into a B-stage state, but can appropriately be selected depending on the constitution of the resin composition. In accordance with the present invention, for the heat treatment, a heat treatment method selected from heat vacuum pressing, heated roll laminating, and the like is preferred for the purpose of eliminating gaps (voids) in the resin layer, which are generated during application. Thereby, a flat B-stage sheet can efficiently be produced.

Specifically, the resin composition layer can be semi-cured in the B-stage state by, for example, hot-press treatment under vacuum (e.g., 1 MPa) at a heating temperature of 80° C. to 130° C. for 1 to 30 seconds.

The thickness of the B-stage sheet can appropriately be selected depending on a purpose, may be, for example, 50 μm or more and 200 μm or less, and is preferably 60 μm or more and 150 μm or less from the aspect of the degree of thermal conductivity and sheet flexibility. Further, it can be produced by performing hot press while laminating two or more resin films.

<Metal Foil with Resin>

The metal foil with a resin according to the present invention includes: a metal foil; and a semi-cured resin layer disposed on the metal foil and derived from the resin composition. It is excellent in the degree of thermal conductivity, electrical insulating properties, and flexibility by being provided with the semi-cured resin layer derived from the resin composition.

The semi-cured resin layer is obtained by heat-treating the resin composition to be in a B-stage state.

As the metal foil, which is gold foil, copper foil, aluminum foil, or the like without particular limitation, the copper foil is generally used.

The thickness of the metal foil is not particularly limited if it is 1 μm to 35 μm, and flexibility is further improved by using the metal foil of 20 μm or less.

Further, a composite foil with a three-layer structure, in which nickel, nickel-phosphorus, a nickel-tin alloy, a nickel-iron alloy, lead, a lead-tin alloy, or the like is used as an intermediate layer and a copper layer of 0.5 to 15 μm and a copper layer of 10 to 300 μm are disposed on both surfaces thereof; or a two-layer structure composite foil in which aluminum and a copper foil are composite may also be used as the metal foil.

The metal foil with a resin can be produced by forming a resin composition layer by applying/drying the resin composition onto a metal foil; and performing heat treatment so that the resin composition layer is in a B-stage state (semi-curing state).

Although conditions of production of the metal foil with a resin are not particularly limited, 80 mass % or more of an organic solvent used in a resin varnish is preferably volatilized in a dried resin composition layer. A drying temperature is around 80 to 180° C., and drying time may be determined in consideration of time of gelation of the varnish and is not particularly limited. As the amount of the applied resin varnish, it is preferably applied so that the thickness of the dried resin layer is 50 to 200 μm, more preferably 60 to 150 μm.

A method for forming a resin composition layer and heat treatment conditions are as described above.

<Resin Sheet>

The resin sheet according to the present invention is formed by performing the heating and pressurization treatment of the resin composition and thermally curing it. Thermal conductivity is excellent due to the cured product of the resin composition.

The conditions of the heating and pressurization treatment of the resin composition are not particularly limited if the resin composition can be cured, but can appropriately be selected depending on the constitution of the resin composition. For example, they may be a temperature of 120 to 180° C., a pressure of 0.5 to 20 MPa, and 10 to 300 minutes.

The thickness of the resin sheet is not particularly limited but can appropriately be selected depending on a purpose. For example, it may be 50 to 5000 μm, and is preferably 50 to 1000 μm, more preferably 100 to 500 μm, from the aspect of thermal conductivity and insulating properties.

EXAMPLES

The present invention will be described below with reference to examples, but the present invention is not limited to these examples. Unless otherwise specified, "%" is based on mass.

Example 1

In a high-temperature tube furnace (35 mm×1200 mm), 5 g of aluminum nitride sintered particles having a volume average particle diameter of 30 μm were put, and temperature was increased from room temperature to 1200° C. for 100 minutes while flowing an Ar gas at 0.5 L/min. After keeping them at 1200° C. for 2 hours, the temperature was decreased from 1200° C. to room temperature for 240 minutes to perform sintering treatment, and aluminum nitride particles on the surfaces of which α-alumina coating layers were formed were obtained.

The obtained aluminum nitride particles on the surfaces of which the α-alumina coating layers were formed were added to dehydrated toluene and 0.25 g of stearic acid was added, followed by being heated under reflux for 2 hours to make composite particles. By washing the obtained composite particles with toluene, followed by drying them at room temperature to perform organic matter coating treatment, composite particles 1 on the surfaces of which coating layers containing α-alumina and coating layers containing an organic matter were formed were obtained.

(Resin Composition)

The obtained composite particles 1 were added and mixed with an epoxy resin (jER828, manufactured by Mitsubishi Chemical Corporation) and a curing agent (Kayahard AA, manufactured by Nippon Kayaku Co., Ltd.) to obtain a resin composition 1 as a resin varnish.

Blending was performed so that the mixed ratio of the epoxy resin and the curing agent was an epoxy/amine equivalent ratio of 1:1 and the mixing ratio of the composite particles was a volume ratio of 60% by volume to the whole resin composition including the epoxy resin, the curing agent, and the composite particles.

The obtained resin varnish was applied to a predetermined thickness with a copper foil (thickness of 70 μm), of which one surface (upper surface) was roughened, as a substrate by casting, followed by being heated and dried to form a resin composition layer to obtain a metal foil with a resin. This metal foil with a resin was put so that the resin composition layer upturned, and the copper foil of which one surface was roughened was laminated so that the roughened surface contacted with the resin composition layer, followed by being hot-pressed under vacuum at 145° C. at 2 MPa and thermally cured to be adhered. This was further completely cured by heating it at a temperature of 205° C. for 2 hours to obtain a sheet-like resin cured product 1.

<Evaluation>

The obtained composite particles, resin composition, and resin cured product were evaluated as described below. The evaluation results are listed in Table 1.

(X-Ray Diffraction)

X-ray diffraction spectra were measured using an X-ray diffractometer (RINT 2500HL, manufactured by Rigaku Corporation) with a CuKα ray as a radiation source, the intensity ratio (hereinafter also referred to as "XRD intensity ratio") of the peak corresponding to the (100) face of α-alumina to the peak corresponding to the (113) face of aluminum nitride in terms of area was measured, and the thickness (coating layer thickness) of the coating layer containing α-alumina was calculated based on the ratio.

Figure 5:
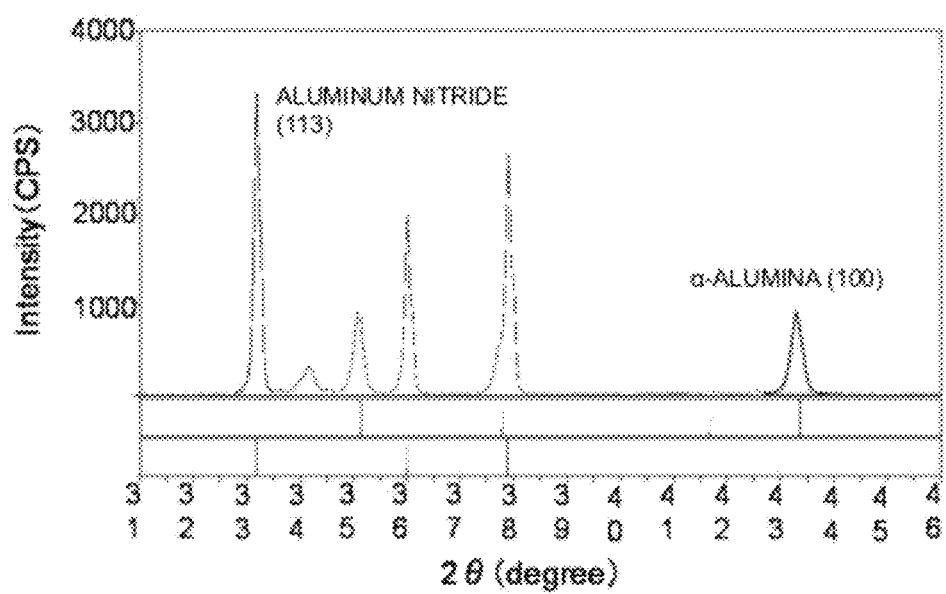
FIG. 5 is a view that indicates an example of the X-ray diffraction spectra of the composite particle according to the present invention.

An example of the obtained X-ray diffraction spectra is indicated in FIG. 5.

(Water Resistance)

For water resistance, 2 g of the obtained composite particles were added to 200 mL of water at 60° C., each pH of the aqueous solution after 30 minutes and 60 minutes was measured, and the effect of ammonia generated by hydrolysis was evaluated.

(Thermal Conductivity)

A test piece was cut from the obtained resin cured product 1, and the copper foils on both surfaces were removed by acid-etching to take only the sheet-like cured resin layer. The thermal diffusivity of the cured resin layer was measured using a flash method apparatus (NETZSCH (Bruker), nanoflash LFA447) and was multiplied by the density measured by the Archimedes method and the specific heat measured by the DSC method to determine the degree of thermal conductivity in a thickness direction.

Example 2

Composite particles, a resin composition, and a resin cured product were obtained in the same manner as in Example 1 except that the atmosphere during sintering the aluminum nitride sintered particles in Example 1 was replaced by atmospheric air in a sealing state.

The obtained composite particles, resin composition, and resin cured product were evaluated in the same manner as in Example 1.

Example 3

Composite particles, a resin composition, and a resin cured product were obtained in the same manner as in Example 1 except that octanoic acid was used instead of stearic acid in Example 1.

The obtained composite particles, resin composition, and resin cured product were evaluated in the same manner as in Example 1.

Example 4

Composite particles, a resin composition, and a resin cured product were obtained in the same manner as in Example 1 except that octanoic acid was used instead of stearic acid in Example 2.

The obtained composite particles, resin composition, and resin cured product were evaluated in the same manner as in Example 1.

Example 5

Composite particles, a resin composition, and a resin cured product were obtained in the same manner as in Example 1 except that lauryl alcohol was used instead of stearic acid in Example 1.

The obtained composite particles, resin composition, and resin cured product were evaluated in the same manner as in Example 1.

Example 6

Composite particles, a resin composition, and a resin cured product were obtained in the same manner as in Example 1 except that lauryl alcohol was used instead of stearic acid in Example 2.

The obtained composite particles, resin composition, and resin cured product were evaluated in the same manner as in Example 1.

Example 7

Composite particles, a resin composition, and a resin cured product were obtained in the same manner as in Example 1 except that propyl alcohol was used instead of stearic acid in Example 1.

The obtained composite particles, resin composition, and resin cured product were evaluated in the same manner as in Example 1.

Example 8

Composite particles, a resin composition, and a resin cured product were obtained in the same manner as in Example 1 except that propyl alcohol was used instead of stearic acid in Example 2.

The obtained composite particles, resin composition, and resin cured product were evaluated in the same manner as in Example 1.

Example 9

Composite particles were obtained in the same manner as in Example 1 except that aluminum nitride sintered particles having a volume average particle diameter of 1 μm were used instead of the aluminum nitride sintered particles having a volume average particle diameter of 30 μm in Example 1.

The obtained composite particles were evaluated in the same manner as in Example 1.

The XRD intensity ratio was 0.04 and the thickness of the coating layer of α-alumina was 20 nm. Further, each pH after 30 minutes and 60 minutes was 7.4 in the evaluation of water resistant.

Example 10

Composite particles were obtained in the same manner as in Example 9 except that propyl alcohol was used instead of stearic acid in Example 9.

The obtained composite particles were evaluated in the same manner as in Example 1.

The XRD intensity ratio was 0.04 and the thickness of the coating layer of α-alumina was 20 nm. Further, each pH after 30 minutes and 60 minutes was 7.5 in the evaluation of water resistant.

Comparative Example 1

Composite particles, a resin composition, and a resin cured product were obtained in the same manner as in Example 1 except that untreated aluminum nitride sintered particles having a volume average particle diameter of 30 μm were used instead of the composite particles in Example 1.

The obtained composite particles, resin composition, and resin cured product were evaluated in the same manner as in Example 1.

Comparative Example 2

Composite particles, a resin composition, and a resin cured product were obtained in the same manner as in Example 1 except that the organic matter coating treatment was not performed after the sintering treatment.

The obtained composite particles, resin composition, and resin cured product were evaluated in the same manner as in Example 1.

Comparative Example 3

Composite particles, a resin composition, and a resin cured product were obtained in the same manner as in Example 1 except that the sintering treatment was not performed in Example 1.

The obtained composite particles, resin composition, and resin cured product were evaluated in the same manner as in Example 1.

Comparative Example 4

In a high-temperature tube furnace (35 mm φ×1200 mm), 5 g of aluminum nitride sintered particles having a volume average particle diameter of 30 μm were put, and temperature was increased from room temperature to 1000° C. for 90 minutes while flowing an Ar gas at 0.5 L/min. After keeping them at 1000° C. for 2 hours, the temperature was decreased from 1000° C. to room temperature for 240 minutes to perform sintering treatment, and aluminum nitride particles on the surfaces of which γ-alumina coating layers as aluminum oxide other than α-alumina were formed were obtained.

The obtained aluminum nitride particles on the surfaces of which the γ-alumina coating layers were formed were added to dehydrated toluene and 0.25 g of stearic acid was added, followed by being heated under reflux for 2 hours to make composite particles. By washing the obtained composite particles with toluene, followed by drying them at room temperature to perform organic matter coating treatment, composite particles on the surfaces of which coating layers containing γ-alumina and coating layers containing an organic matter were formed were obtained.

A resin composition and a resin cured product were obtained in the same manner as in Example 1 except that the obtained composite particles were used.

The obtained composite particles, resin composition, and resin cured product were evaluated in the same manner as in Example 1.

Comparative Example 5

Composite particles, a resin composition, and a resin cured product were obtained in the same manner as in Comparative Example 4 except that the atmosphere during sintering the aluminum nitride sintered particles in Comparative Example 4 was replaced by atmospheric air in a sealing state.

The obtained composite particles, resin composition, and resin cured product were evaluated in the same manner as in Example 1.

Comparative Example 6

Composite particles, a resin composition, and a resin cured product were obtained in the same manner as in Comparative Example 5 except that the sintering was performed while flowing dry air at 0.1 L/m during sintering the aluminum nitride sintered particles in Comparative Example 4.

The obtained composite particles, resin composition, and resin cured product were evaluated in the same manner as in Example 1.

Comparative Example 7

Composite particles, a resin composition, and a resin cured product were obtained in the same manner as in Example 1 except that the organic matter coating treatment was performed using n-propyldimethylethoxysilane instead of stearic acid in Example 1.

The obtained composite particles, resin composition, and resin cured product were evaluated in the same manner as in Example 1.

TABLE 1

| | Volume average particle diameter (μm) | Sintering temperature (° C.) | Sintering environment | Organic compound | XRD intensity ratio | Thickness (nm) of coating layer of α-alumina | pH (after 30 minutes) | pH (after 60 minutes) | Degree of thermal conductivity (W/mK) |
|---|---|---|---|---|---|---|---|---|---|
| Example 1 | 30 | 1200 | Ar | Stearic acid | 0.0056 | 80 | 7.4 | 7.5 | 3.5 |
| Example 2 | 30 | 1200 | Atmospheric air | Stearic acid | 0.029 | 400 | 7.5 | 7.5 | 3 |
| Example 3 | 30 | 1200 | Ar | Octanoic acid | 0.0056 | 80 | 7.4 | 7.4 | 3.4 |
| Example 4 | 30 | 1200 | Atmospheric | Octanoic | 0.029 | 400 | 7.5 | 7.5 | 3.1 |

TABLE 1-continued

| | Volume average particle diameter (μm) | Sintering temperature (° C.) | Sintering environment | Organic compound | XRD intensity ratio | Thickness (nm) of coating layer of α-alumina | pH (after 30 minutes) | pH (after 60 minutes) | Degree of thermal conductivity (W/mK) |
|---|---|---|---|---|---|---|---|---|---|
| Example 5 | 30 | 1200 | air Ar | acid Lauryl alcohol | 0.0056 | 80 | 7.4 | 7.5 | 3.4 |
| Example 6 | 30 | 1200 | Atmospheric air | Lauryl alcohol | 0.029 | 400 | 7.5 | 7.5 | 2.9 |
| Example 7 | 30 | 1200 | Ar | Propyl alcohol | 0.0056 | 80 | 7.5 | 7.5 | 3.4 |
| Example 8 | 30 | 1200 | Atmospheric air | Propyl alcohol | 0.029 | 400 | 7.4 | 7.4 | 3 |
| Comparative Example 1 | 30 | — | — | — | — | — | 10.2 | 10.4 | 3.9 |
| Comparative Example 2 | 30 | 1200 | Atmospheric air | — | 0.0056 | 80 | 9.8 | 10.1 | 3.5 |
| Comparative Example 3 | 30 | — | — | Stearic acid | — | — | 7.5 | 8.4 | 2.9 |
| Comparative Example 4 | 30 | 1000 | Ar | Stearic acid | — | — | 7.4 | 7.5 | 1.9 |
| Comparative Example 5 | 30 | 1000 | Atmospheric air | Stearic acid | — | — | 7.6 | 7.7 | 1.5 |
| Comparative Example 6 | 30 | 1000 | Dry air | Stearic acid | — | — | 7.6 | 7.7 | 1.1 |
| Comparative Example 7 | 30 | 1200 | Ar | n-propyl dimethyl ethoxysilane | 0.0056 | 80 | 7.5 | 8.2 | 2.9 |

(SEM-EDX Analysis)

In the composite particles obtained in Example 1, the distributions of carbon atoms, oxygen atoms, and aluminum atoms on the surfaces of the composite particles were analyzed using SEM-EDX (SEM: SEM-S3400N, manufactured by Hitachi High-Technologies Corporation) (EDX: Genesis XM2, manufactured by Ametek Co., Ltd.).

Figure 2:
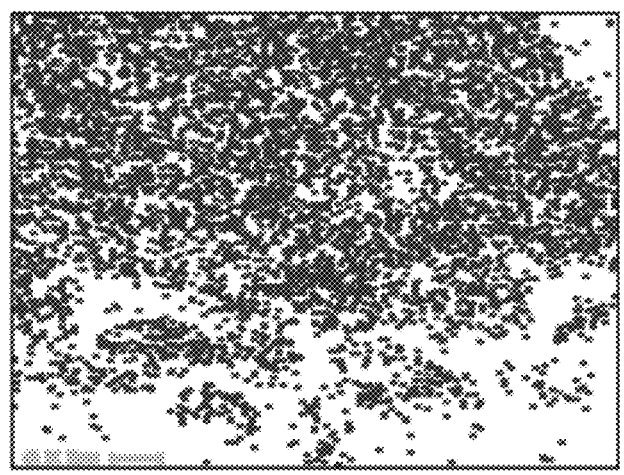
FIG. 2 is a view that represents an example of the distribution of oxygen atoms in SEM-EDX analysis of the composite particle according to the present invention.
Figure 3:
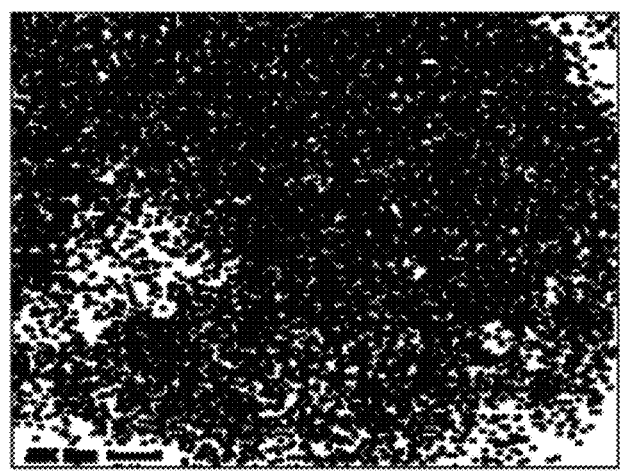
FIG. 3 is a view that represents an example of the distribution of aluminum atoms in SEM-EDX analysis of the composite particle according to the present invention.
Figure 4:
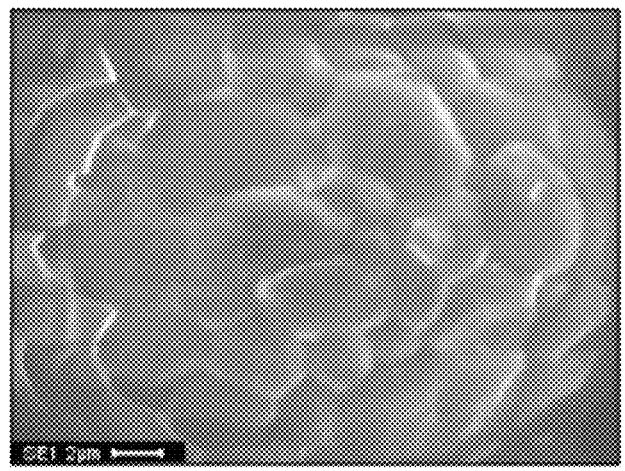
FIG. 4 is a view that represents an example of the SEM image of the composite particle according to the present invention.

FIG. 1 to FIG. 4 represent an example of the results of the analysis of the composite particle according to the present invention using SEM-EDX (SEM: SEM-S3400N, manufactured by Hitachi High-Technologies Corporation) (EDX: Genesis XM2, manufactured by Ametek Co., Ltd.). All of FIG. 1 to FIG. 4 are the images of the same visual field, FIG. 1, FIG. 2, and FIG. 3 represent the distribution of carbon atoms, the distribution of oxygen atoms, and the distribution of aluminum atoms, respectively, and FIG. 4 represents a corresponding SEM image.

(Thermogravimetric Analysis TG)

The thermogravimetric analysis of the composite particles obtained in Example 1 was performed using a thermogravimetric analyzer (Q500, manufactured by TA Instruments, Inc.) on the measurement condition of 25 to 800° C. at a rate of temperature increase of 10° C./min under atmospheric air.

As a result, the loss of the weight of the composite particles due to the decomposition of the organic matter revealed that the organic matter contained 0.05 mass % of the composite particles.

Thus, it is found that the composite particle according to the present invention is excellent in water resistance. Further, it is found that the resin composition including the composite particle according to the present invention can form a resin cured product excellent in thermal conductivity.

The disclosure of JP A 2010-033050 is incorporated herein by reference in its entirety.

All documents, patent applications, and technical standards mentioned in this specification are herein incorporated by reference to the same extent as if each individual document, patent application, and technical standard was specifically and individually indicated as being incorporated by reference.

The invention claimed is:

1. A composite particle comprising:
    an aluminum nitride particle;
    a first coating layer that contains a-alumina and coats at least a part of a region of a surface of the aluminum nitride particle; and
    a second coating layer that contains organic matter and coats a region other than the first coating layer of the surface of the aluminum nitride particle.

2. The composite particle according to claim 1, wherein the organic matter is a reaction product of a compound comprising a hydrocarbon group having a carbon number of 1 to 24 and at least either of hydroxy or carboxy groups with aluminum nitride.

3. The composite particle according to claim 1, wherein the composite particle has an intensity ratio of a peak corresponding to a (100) face of a-alumina to a peak corresponding to a (113) face of aluminum nitride, of 1 or less in terms of area, in X-ray diffraction by a CuKα ray.

4. A resin composition comprising: the composite particle according to claim 1; an epoxy resin; and a curing agent.

5. A metal foil with a resin, comprising: a metal foil; and a semi-cured resin layer disposed on the metal foil and derived from the resin composition according to claim 4.

6. A resin sheet, which is a cured product prepared by heating and pressurization treatment of the resin composition according to claim 4.

7. A composite particle comprising:
    an aluminum nitride particle;
    a first coating layer comprising a-alumina, wherein the first coating layer coats a surface of the aluminum nitride particle, at least one crack is formed through the first coating layer, the first coating layer does not coat the surface of the aluminum nitride particle at the least one crack; and a second coating layer comprising organic matter, wherein the second coating layer is disposed in the at least one crack.

* * * * *